US010691301B2

(12) United States Patent
Santisteban et al.

(10) Patent No.: US 10,691,301 B2
(45) Date of Patent: Jun. 23, 2020

(54) POLYMORPHIC SMART CONTEXT-AWARE LISTS

(71) Applicant: Microsoft Technology Licensing, LLC, Redmond, WA (US)

(72) Inventors: Adolfo Hernandez Santisteban, Bothell, WA (US); Bryant Daniel Hawthorne, Duvall, WA (US); Matthew Steven Johnson, Kirkland, WA (US); Donna Katherine Long, Redmond, WA (US); Mario Emmanuel Maltezos, Redmond, WA (US); Christian Michael Sadak, Seattle, WA (US); Andrew Austin Jackson, Kirkland, WA (US); Jamie R. Cabaccang, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 72 days.

(21) Appl. No.: 15/912,840

(22) Filed: Mar. 6, 2018

(65) Prior Publication Data
US 2019/0278435 A1     Sep. 12, 2019

(51) Int. Cl.
| G06F 3/048 | (2013.01) |
| G06N 20/00 | (2019.01) |
| G06F 3/0482 | (2013.01) |
| G06F 3/0486 | (2013.01) |
| G06F 40/205 | (2020.01) |

(52) U.S. Cl.
CPC .......... *G06F 3/0482* (2013.01); *G06F 3/0486* (2013.01); *G06F 40/205* (2020.01); *G06N 20/00* (2019.01)

(58) Field of Classification Search
CPC . G06F 9/54; G06F 17/27; G06F 3/048; G06F 17/00; G06F 9/00; G06F 3/00; G06N 20/00
See application file for complete search history.

(56) References Cited

U.S. PATENT DOCUMENTS

| 8,042,110 B1 | 10/2011 | Kawahara et al. |
| 9,354,800 B2 | 5/2016 | Cummins et al. |
| 9,436,774 B2 | 9/2016 | Stuart |
| 9,690,830 B2 | 6/2017 | Decker et al. |
| 9,760,606 B1* | 9/2017 | Wilczynski ............ G06F 16/215 |
| 2001/0043210 A1* | 11/2001 | Gilbert ...................... G06F 3/14 345/420 |
| 2009/0193351 A1* | 7/2009 | Lee ........................ G06F 3/0482 715/769 |

(Continued)

*Primary Examiner* — Hugo Molina

(57) ABSTRACT

Embodiments relate to enabling a user of data-sharing applications executing on a computing device to indirectly exchange objects between the applications by adding objects from the applications to a journal application that manages a display area. The objects are displayed in the display area. The journal application collects metadata related to the objects and automatically curates lists of the objects according to the metadata. Curation of a list may involve moving objects into a list, merging objects, creating new objects out of content of existing objects, grouping objects according to a commonality thereof, etc. Machine learning services may be invoked to acquire additional metadata about the objects and to make curation decisions.

20 Claims, 7 Drawing Sheets

(56) References Cited

U.S. PATENT DOCUMENTS

| | | | |
|---|---|---|---|
| 2014/0129182 A1* | 5/2014 | Weatherhead | G06F 17/50 |
| | | | 703/1 |
| 2014/0278862 A1 | 9/2014 | Muppala | |
| 2015/0286616 A1* | 10/2015 | Davey | G06F 17/2264 |
| | | | 715/249 |
| 2015/0355792 A1* | 12/2015 | Kim | G06F 3/0488 |
| | | | 715/810 |
| 2016/0026720 A1 | 1/2016 | Lehrer et al. | |
| 2016/0119678 A1 | 4/2016 | Odryna et al. | |
| 2016/0196058 A1* | 7/2016 | Kim | G06F 3/0488 |
| | | | 715/739 |
| 2017/0083182 A1* | 3/2017 | Singh | G06F 9/451 |
| 2017/0111668 A1 | 4/2017 | Fan | |
| 2017/0155737 A1 | 6/2017 | Jannink et al. | |
| 2018/0314972 A1* | 11/2018 | Swindell | G06F 9/451 |
| 2019/0114298 A1* | 4/2019 | Acharya | G06F 17/27 |
| 2019/0129940 A1* | 5/2019 | Hewitt | G06F 17/2785 |

\* cited by examiner

POLYMORPHIC SMART CONTEXT-AWARE LISTS

BACKGROUND

Modern computing devices that are designed for graphical interactive use may have many applications installed for diverse purposes. Typically, each application has its own data. At times, users need to share data between applications on a device. While most operating systems provide inter-process communication (IPC) facilities to allow applications to directly share data, application-to-application IPC-based exchange of data is burdensome to program and lacks flexibility; each datatype exchanged may need its own custom programming. Consequently, most user-oriented operating systems include special system facilities or services to enable arbitrary applications to exchange data. Such cut-and-paste services include application programming interfaces (APIs), background processes to intermediate exchanges, class or container definitions, and other known elements. Applications programmed to use cut-and-paste may use the operating system facilities to indirectly exchange data, typically through a cut-paste buffer, a clipboard, pasteboard, or similar storage managed by the system. An application need only be programmed for the cut-and-paste API and it will then be able to exchange arbitrary data with arbitrary applications on the same device (or on other devices, in some cases).

The proliferation of applications has led to some shortcomings and previously unappreciated opportunities. For one, the proliferation of applications has led to a proliferation of datatypes. A clipboard, journal, or similar object-collecting application may accumulate a wide range of datatypes or objects with varying types of content. A data-exchange or cut-and-paste system may lead to a situation where many applications are able to exchange data but may not be able to conveniently understand each other's data. As only the inventors have observed, previously, intermediating software has served as a mere static collection and distribution point for inter-application data exchange. The ability for applications to actually exchange data has been limited; often, one application will not be able to consume journal or clipboard data provided by another application. Only the inventors have appreciated that there is an opportunity to improve inter-application data exchange via cut-and-paste-like systems by implementing a pasteboard or similar store to dynamically and intelligently curate the objects it receives.

In addition, only the inventors have appreciated that, often, applications for collecting arbitrary objects from other applications are used by users to accomplish specific tasks, pursue common topics or themes, etc. Journaling applications have not been implemented to provide higher level functionality such as synthesizing and analyzing content to infer user intent, topics of interest, etc. The inventors have appreciated that applications that collect heterogenous types of objects from other applications can be improved by adding intelligence to derive and act on high level conclusions about the content a user has added.

Furthermore, applications for collecting cut-and-paste data have failed to take advantage of machine learning and artificial intelligence (learning algorithms). Not only have such applications been designed to be mere static object-collecting tools, they have failed to take advantage of machine learning to enable higher level functionality as noted above.

Techniques related to improving inter-application exchange of objects are discussed below.

SUMMARY

The following summary is included only to introduce some concepts discussed in the Detailed Description below. This summary is not comprehensive and is not intended to delineate the scope of the claimed subject matter, which is set forth by the claims presented at the end.

Embodiments relate to enabling a user of data-sharing applications executing on a computing device to indirectly exchange objects between the applications by adding objects from the applications to a journal application that manages a display area. The objects are displayed in the display area. The journal application collects metadata related to the objects and automatically curates lists of the objects according to the metadata. Curation of a list may involve moving objects into a list, merging objects, creating new objects out of content of existing objects, grouping objects according to a commonality thereof, etc. Machine learning services may be invoked to acquire additional metadata about the objects and to make curation decisions.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

DETAILED DESCRIPTION

Figure 1:
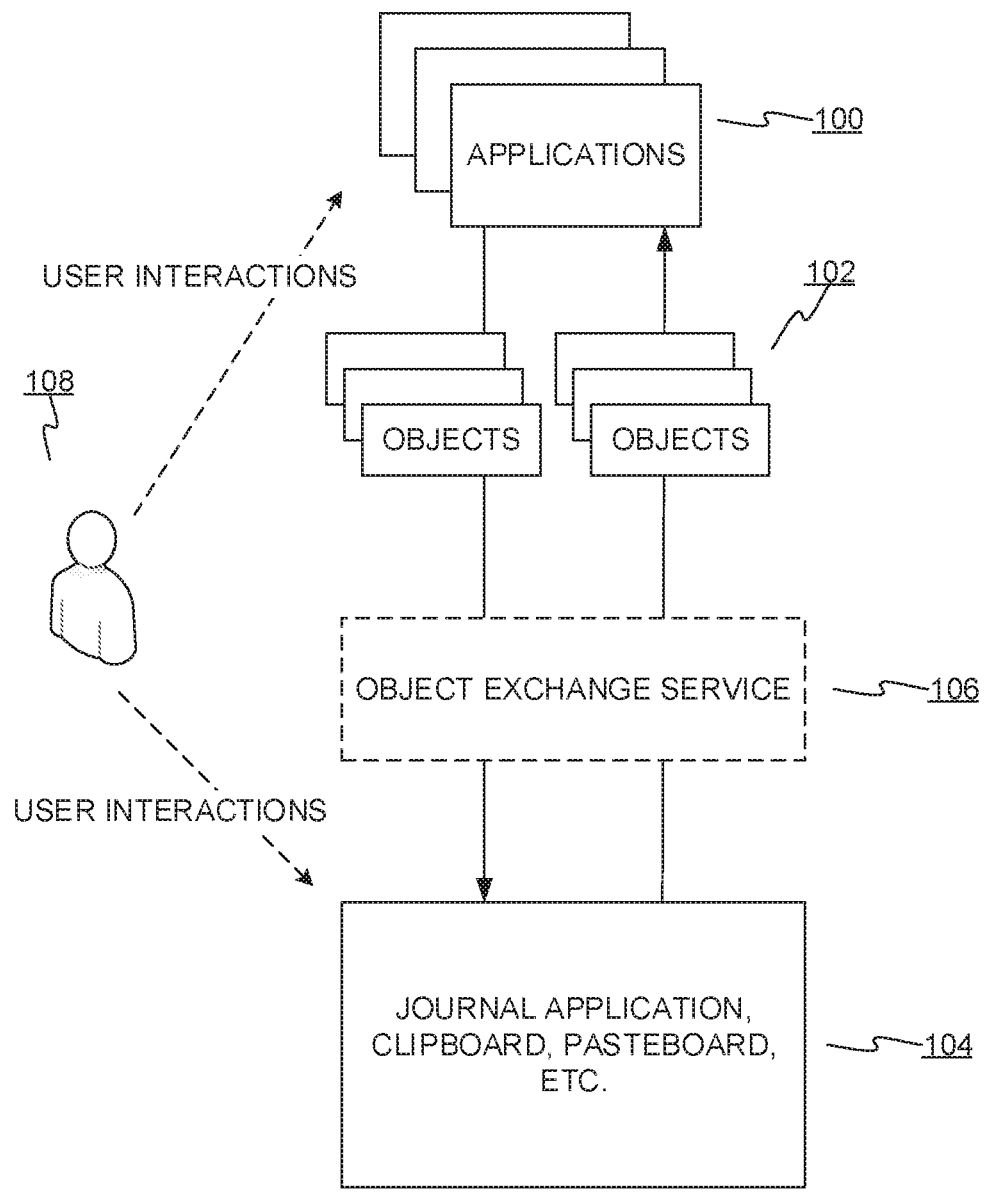
FIG. 1 shows data-sharing applications exchanging objects with a journal application.

FIG. 1 shows data-sharing applications 100 exchanging objects 102 with a journal application 104. A data exchange service 106 may be used to intermediate the exchange of the objects 102. A user 108 interacts with the data-sharing applications 100 to select objects to be copied to the journal application 104. The user 108 also interacts with the journal application 104 to copy objects from the journal application 104 to the data-sharing applications 100. The data-sharing applications 100, objects 102, object exchange service 106, and journal application 104 may all reside on a single computer, which is described further below with reference to FIG. 7.

The data-sharing applications 100 may be implemented as operating system processes, threads, or other generic execution units managed by an operating system of the host computing device. The data-sharing applications 100 may be installed for easy access via a desktop or graphical user shell. Typically, data-sharing applications have graphical user interfaces (GUIs) displayed on a display of the host computing device. The GUIs may be used by the user 108 to select objects to copy to the journal application 104. The GUIs may also be used to copy objects from the journal application 104 (e.g., drag-and-drop). In some embodiments, the data-sharing applications 100 are configured to invoke APIs of the object exchange service 106, encapsulate or format objects 102 or content as necessitated by the particular object exchange service 106. For some embodiments described herein, the source or destination of the objects 102 or the means by which they are exchanged are not significant and an object exchange service 106 may not be implicated.

The object exchange service 106 may be any known cut-and-paste service or similar service, often part of the host operating system. The object exchange service 106 is characterized by the ability to intermediate the exchange of arbitrary objects between arbitrary applications. A memory buffer, clipboard, pasteboard, or similar persistent or ephemeral construct may be used to store and export objects that have been copied via the exchange service. An API may provide the data-sharing applications 100 with access to the service and stored objects. Some object exchange services may also implement network channels to enable cut-and-paste functionality between affiliated devices.

The objects 102 generally originate with the data-sharing applications, although, as discussed below, the journal application 104 may also generate objects 102 that are made available to the data-sharing applications 100. The objects may comprise various datatypes and types of content. As noted, in some instances objects may be encapsulated in wrappers. Methods for forming objects are known and described elsewhere. The content may be image data, video data, text, application-specific objects such as geographic map objects, product reviews, user contacts, JavaScript Object Notation objects, markup language code, text messages, web page clips, and so forth. Some object exchange services may enable exchangeable objects to be structured with multiple representations of the relevant content, which may make it easier for receiving applications to consume the content of the objects. For example, representations of an object may include different encodings or formats of the same content.

Figure 2:
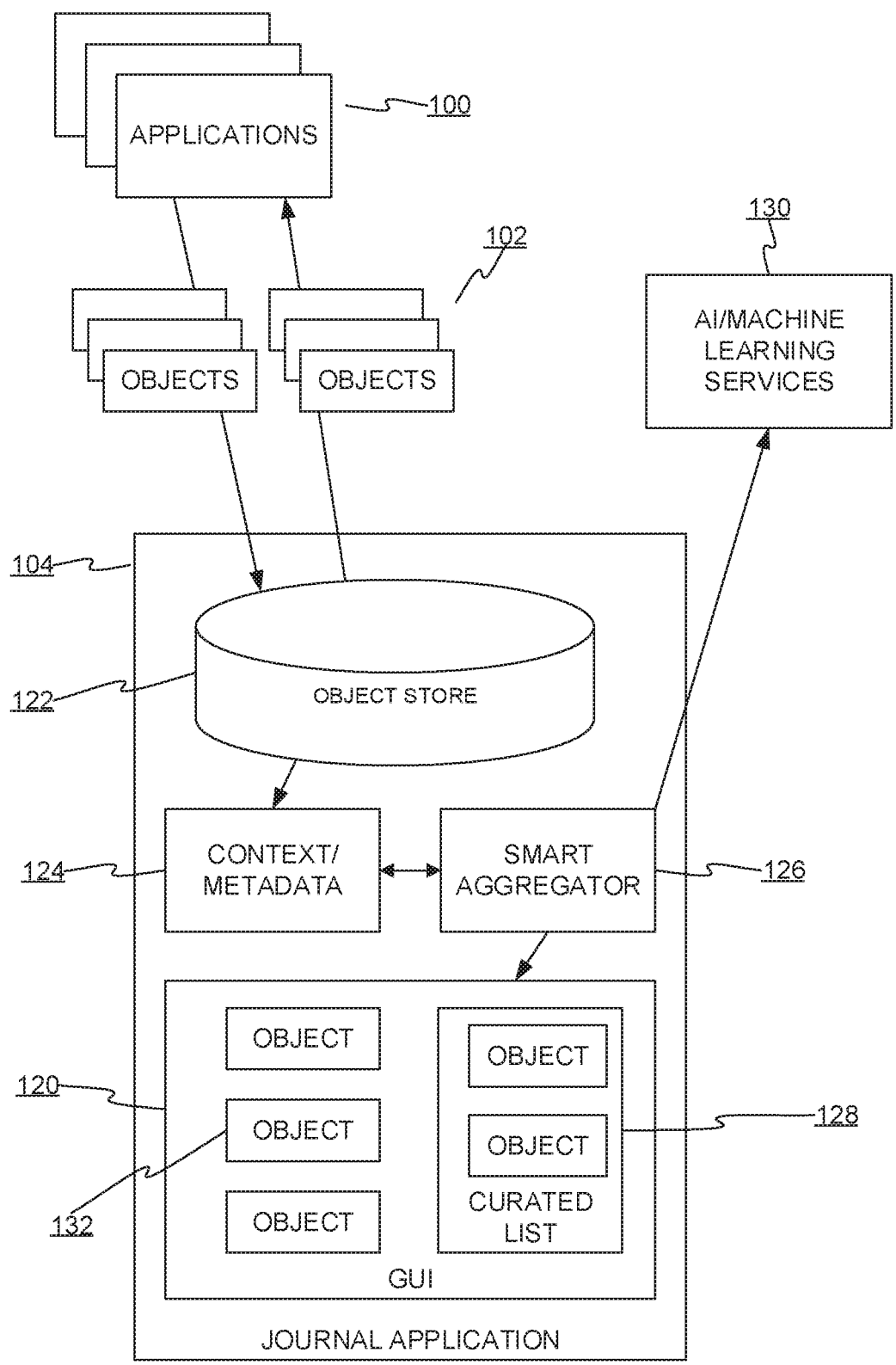
FIG. 2 shows details of the journal application.

FIG. 2 shows details of the journal application 104. The term "journal" is used to distinguish from the data-sharing applications 100 and does not connote any features of the journal application 104. Nonetheless, the intent of the journal application 104 is to serve as a palette for the user 108 to collect objects 102. As such, the journal application 104 includes a GUI that includes a view or display area 120, which may be a scrollable surface or window, etc. The display area 120 is part of the journal application 104. The display area 120 may be implemented for drag-and-drop functionality so that the objects 102 can be interactively dragged and dropped to the display area 120. Similarly, the application 104 may exchange objects using keyboard or voice actuated cut-and-paste commands.

The journal application 104 may implement an object store 122 to store objects received from the data-sharing applications 100. The object store 122 may also store objects that the journal application generates itself, as discussed below. The journal application 104 may also have a context store 124 to store context data, described below. The journal application 104 also has a smart aggregator 126 which uses the context data 124, among other information, to curate lists 128. The smart aggregator 126 may access or implement machine learning services 130 to obtain information and insights about the objects 102 being stored. The smart aggregator 126 may in turn use information from the machine learning services 130 to manage lists 128. The machine learning services 130 are discussed below with reference to FIG. 4.

The display area 120 displays graphic representations 132 of the objects managed by the journal application 104. The graphic representations may be any type of icon, thumbnail image, interactive user interface element, or the like. The informational content of the graphic representations, e.g., text labels, titles, image data, etc. is controllable by the journal application 104. By default, objects from the data-sharing applications may be portrayed with a default appearance as set by the data-sharing applications. The journal application 104 may determine how to portray an object. The appearance or exposed representations of objects in a curated list 128 may depend on the nature of the list. For example, a curated list 128 might have a primary datatype, topic, keyword, or other attribute that affects the appearance (or other attributes) of the objects it contains, as described below.

The smart aggregator 126 is a component of the journal application 104 that receives information, for instance context data from the context store 124, to curate lists 128. The lists are themselves objects that are represented in the display area 120, and, in some implementations, may themselves be exportable via the sharing service. However, unlike the objects shown in the display area 120, the curated lists 128 originate with the journal application 104 and various attributes of the lists are curated by the smart aggregator 126. As will be described in detail below, the smart aggregator 126, making decisions based on the context data in the context store 124, may perform edits or transforms on the set of objects represented in the display area 120. Curative transforms may include, for instance, adding new lists responsive to various types of events, changing the datatypes or graphic representations of objects, extracting data from objects and inserting the data into the display area 120 in the form of graphic representations of objects or new objects (including lists), selecting the active representations of objects, rearranging object representations, splitting objects, merging objects, changing interactive GUI features of objects, rearranging the graphic representations to appear as a list, etc.

A curated list 128 can be implemented in several ways. In one embodiment, the smart aggregator 126 manages each list. In another embodiment each list is an instance of a class and each instance has its own logic to self-curate. Description herein of curation techniques and algorithms may be implemented with either or both approaches. In either case, the smart aggregator 126 monitors conditions and identifies when a new list is needed. Description herein of curative logic performed by the smart aggregator 126 is equally applicable to list-based implementation and description herein of either (or of the journal application) stands as description of both. Curation logic is described further below.

Figure 3:
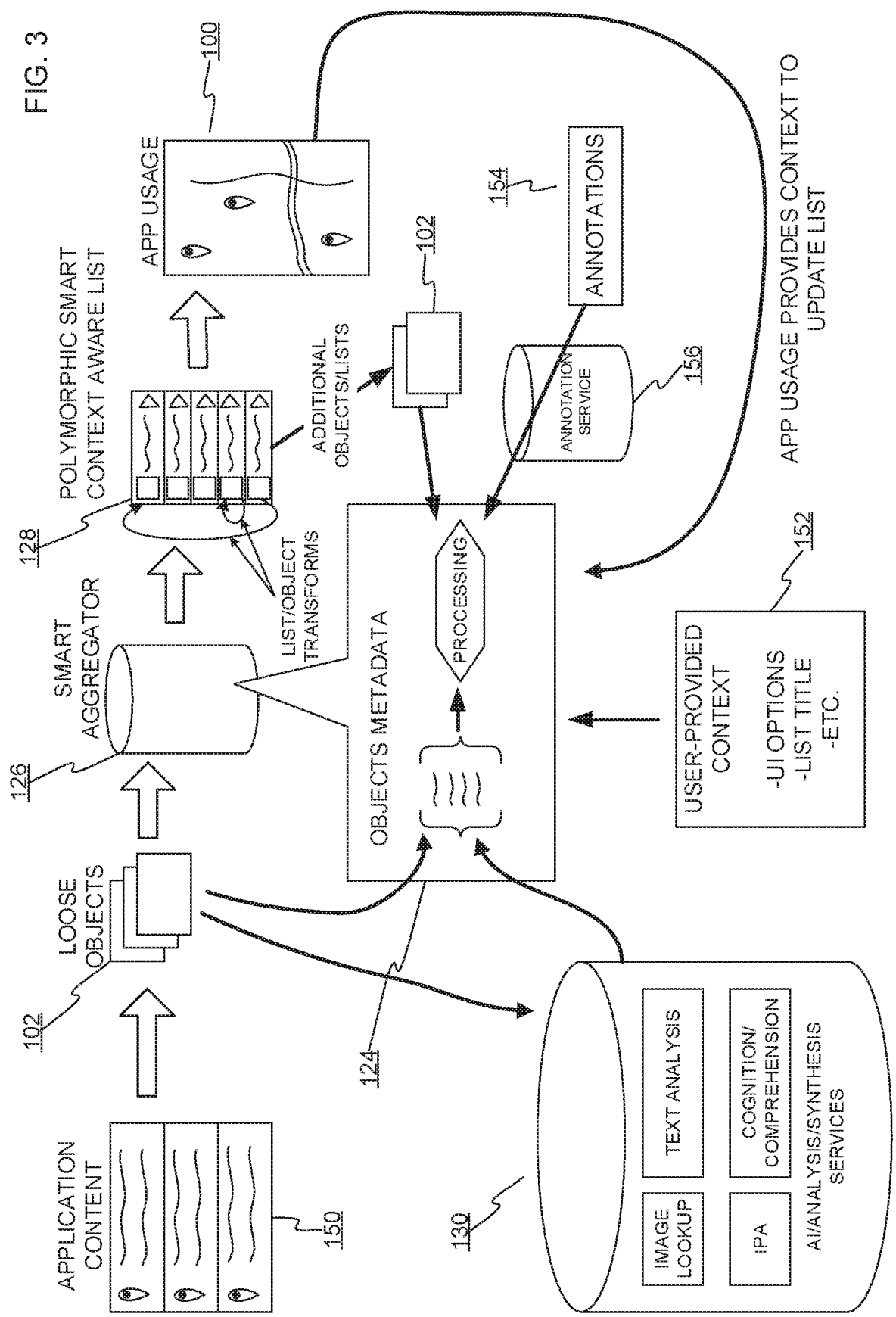
FIG. 3 shows a dataflow diagram of components that may be involved in smart curation of a cut-and-paste content collection area.

FIG. 3 shows a dataflow diagram of components that may be involved in smart curation of a cut-and-paste content collection area. Arbitrary objects 102 are provided from arbitrary application content 150 of the data-sharing applications 100. Each time an object is received by the journal application the object is stored in the object store 122 and its intake may be processed by the smart aggregator 126 (intake logic may also be performed on objects generated by the journal application). In addition to tracking each object, the smart aggregator 126 may keep metadata for each respective object. The context store 124 may store the objects' metadata as well as other contextual information. The metadata associated with an object might include a reference to the object, an application or application type that provided the object, a set of keywords, attributes, a date-time when the object was taken in, or other information extracted from or associated with the object.

The contextual data may include other sources of information which may be object-specific, list-specific, or global. Metadata may be supplied from the usage of applications 100. Which applications were used and when (with object date-times, can provide a correlative signal), what data was associated with the application usage, for instance. The contextual data may include user-provided context 152. User-provided context 152 is information that reflects the user's preferences. Configuration settings of the journal application, perhaps set with its GUI, may be included. Any information that was inputted or selected by the user may be included. Contextual data may also include annotations 154 inputted via an annotation service 156. Annotations include stand-alone annotations added to the display area (e.g., in the form of digital ink), annotations to objects, lists, etc. Annotations may also include toggles of flags shown in object representations 132, deletions of objects, etc. If machine learning services 130 are available, they may be used to obtain supplemental contextual and object metadata. An incoming object may be passed to the machine learning services 130 to obtain metadata about the object, such as features extracted from media content (if such is present in the object), keywords or topics derived from text of the object, and so on. If an intelligent personal assistant (IPA, i.e., virtual assistant) is available, the IPA might know additional information about the object, such as how it was obtained, what type of task the user was engaged in, what local/remote search queries the user has issued recently, etc. This set of contextual data is available for the smart aggregator 126 to make curation decisions perhaps with assistance from the machine learning services 130. One such curation decision is the creation of a new list 128.

As shown in FIG. 3, the smart aggregator 126 may decide whether to create a new list 128 of objects 102. The decision may be precipitated by any event such as a new inbound object, a user interaction with an object represented in the display area 120, deletion of an object, dragging an object in the display area onto another object, editing an object, adding an annotation, a regularly scheduled background state check or update, etc. The decision whether to create a new list may be based on any of the available contextual data. In some implementations, list creation will be an automatic result of certain events (e.g., user commands). In other implementations list creation may be decided conditionally based on the contextual data (e.g., by inference, heuristics, deduction, etc.). Similarly, the properties of a new list, e.g., which objects are included, where they come from, the properties of the contents of the list, may be based on the contextual data or the nature of the triggering event (e.g., a user command).

Preferably, the objects graphically represented in a list 128, possibly including objects generated by the smart aggregator 126, are objects capable of being passed to data-sharing applications 102 via the object exchange service 106 (e.g., past-capable). As can be seen, list curation expands the journal application's ability to facilitate inter-application object exchanges. The chance of content in the journal application being in a form convenient to the user is increased.

The objects to include in a list may be computed in several ways. A set of objects may be determined to be mutually associated in some way, and the objects are then added to the new list. Objects may be associated by virtue of a common feature (perhaps in the contextual metadata), for instance a same keyword, a same datatype, related content, a same source application, features in the contextual metadata, etc. Objects may be associated manually by a GUI operation or a grouping algorithm such as a clustering algorithm. In one embodiment, all objects in the display area may be added to a new list. In yet another embodiment, the entire display functions as a curated list. Formation of a list may also include consolidating two or more objects into one. Formation of a new list may include eliciting user input for confirmation and configuration.

A list 128 may have its own graphics to frame or overlay included objects, including possibly object-specific GUI elements. Alternatively, a list's graphic representation may comprise nothing more than the graphic representations of its objects, arranged in some coherent structure reflecting the grouping of the objects in the list. The graphic representations of the objects may or may not be curated by the smart aggregator 126. If they are, the smart aggregator 126 may change their appearance, displayed content, representation, or corresponding object datatype of an object to suit the list (e.g., a datatype, topic, application, or other metadata about the list). In short, objects in a list may be tailored to suit the list in various ways.

In one embodiment, the smart aggregator 126 may extract pieces of content from an object and place the pieces in respective objects that are added to the list. For example, the smart aggregator may decide that all instances of a piece of content (or pieces satisfying a given condition) found in any object in the list are to be displayed as new independent objects in the list.

Figure 4:
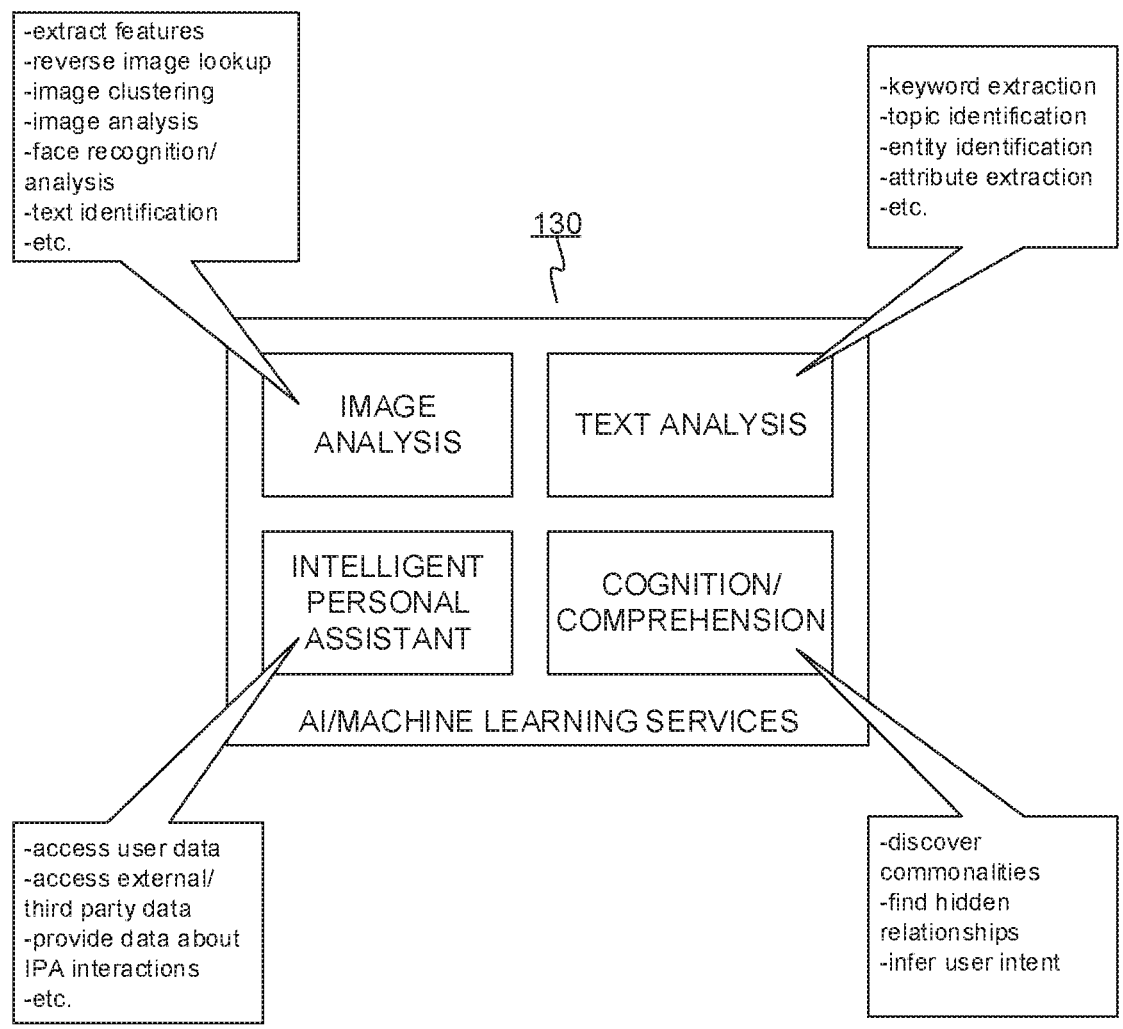
FIG. 4 shows details of machine learning services.

FIG. 4 shows details of the machine learning services 130. As noted above, the machine learning services 130 may be used for many curation-related functions. The machine learning services 130 may execute on the local host, in a cloud, or both. The machine learning services 130 may include any known implementations of machine learning algorithms, including opensource code, commercial cloud providers, and elsewhere. The types of insights that a machine learning component may add include learning about what kinds of data a user has grouped together in the past. Or, for learning machines trained with data from many users, a learning machine might make inferences about a user's activity based on the past activity of user population. This might enable the system to reach conclusions such as the tendency for users to look up the address of a restaurant after making a list of restaurants, and the phone numbers of restaurants in the list might accordingly have their respective phone numbers surfaced on their representations in the list.

The machine learning services may include image analysis functions, e.g., image identification, reverse image lookup, image feature extraction, and others. The machine learning services 130 may also include text analysis services. The text analysis services may perform keyword extraction, topic identification, identity identification/linking, attribute extraction, and other known text processing algorithms. The machine learning services may include artificial cognitive or comprehension learning algorithm services. These services may discover commonalities among a set of items, find hidden relationships, infer a topic or user intent, and other known reasoning algorithms.

An IPA, or virtual assistant, is another type of service that can be used by the journal application. An IPA can be particularly helpful for voice commanding, interfacing with other machine learning services, providing context metadata from beyond the scope of the journal application (e.g., indicia of user activity), and so forth. The machine learning services may also include an add-in module (e.g., "skill"), perhaps selected by a user and associated with an account of the user, that is added to the IPA. Such an IPA-based agent can perform curative functions and decisions, help the journal application communicate with the machine learning services, and others.

In sum, the machine learning services may be passed any of the contextual data and return many types of original or context-derived information useful to the smart aggregator to curate lists.

Figure 5:
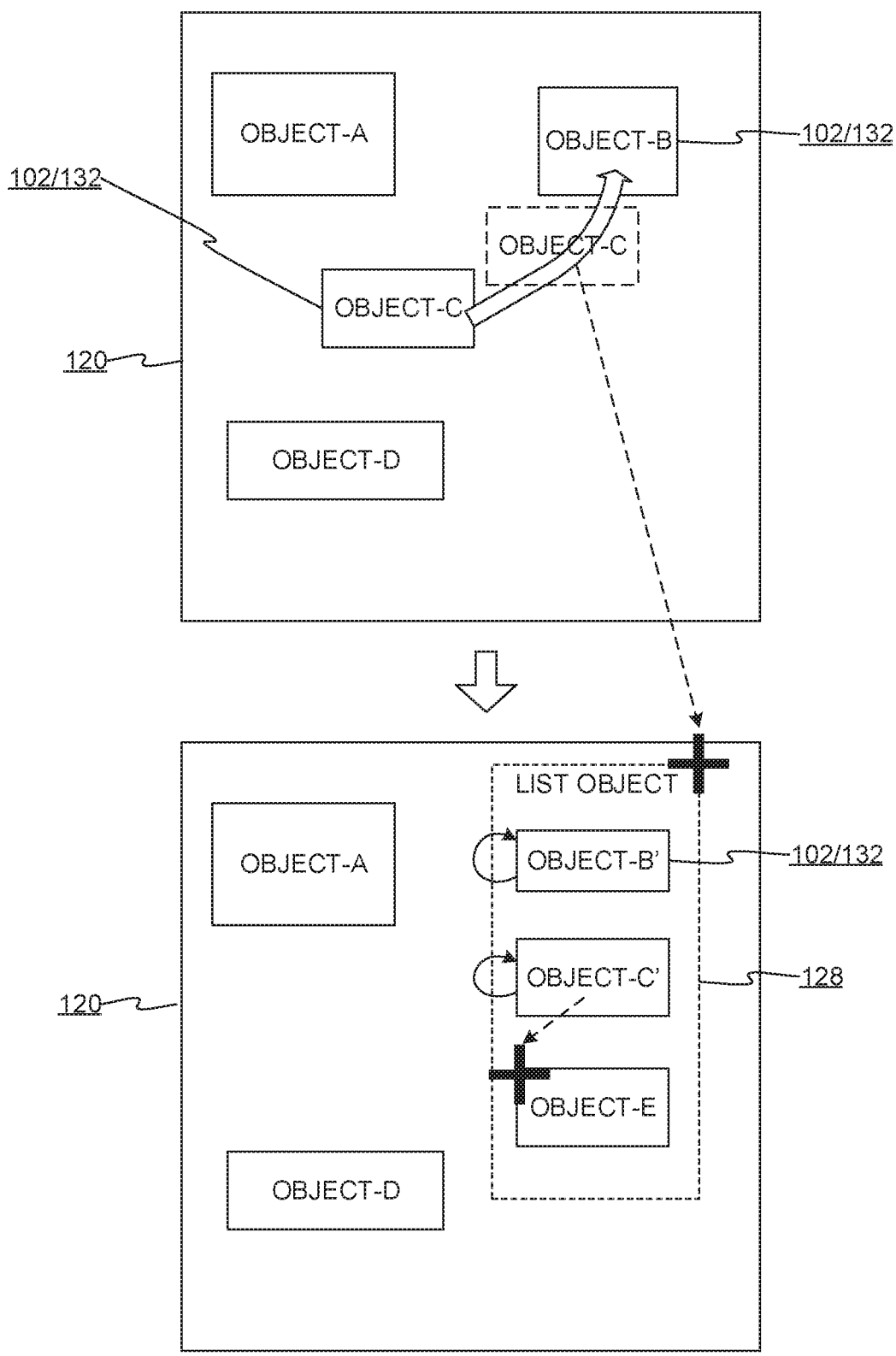
FIG. 5 shows examples of curation transforms that the journal application may perform.

FIG. 5 shows examples of curation transforms that the journal application may perform. In the upper half of FIG. 5, object-C has been manually dragged onto object-B. This event is responded to by the smart aggregator selecting a corresponding operation. In this example, the operation involves determining a feature of a new list and instantiating a new list accordingly. In one embodiment, the drop of object-C onto object-B causes a list instantiation that incorporates the objects and also transforms them based on a feature of the list. For instance, if the smart aggregator determines that a topic or keyword of the list is "restaurant", then the smart aggregator may transform object-B to object-B' in a corresponding way. For example, if object-B and object-C each have a "review" representation and a "map" representation, the smart aggregator may choose to display the "review" representation (or content). As another example, the list may take on an attribute of the object that is the target of the drop operation. In the example of FIG. 5, object-C would be transformed in some way to be consistent with object-B.

Another transform that might occur upon instantiation is formation of a new object—object-E—from a variety of operations. A feature of the list may serve as a guide to extracting information from objects in the list and using that information to form new object-E. Any of the transformations that can be performed upon instantiation of a new list can also be performed on existing lists responsive to GUI events, background monitoring of contextual data, etc.

Figure 6:
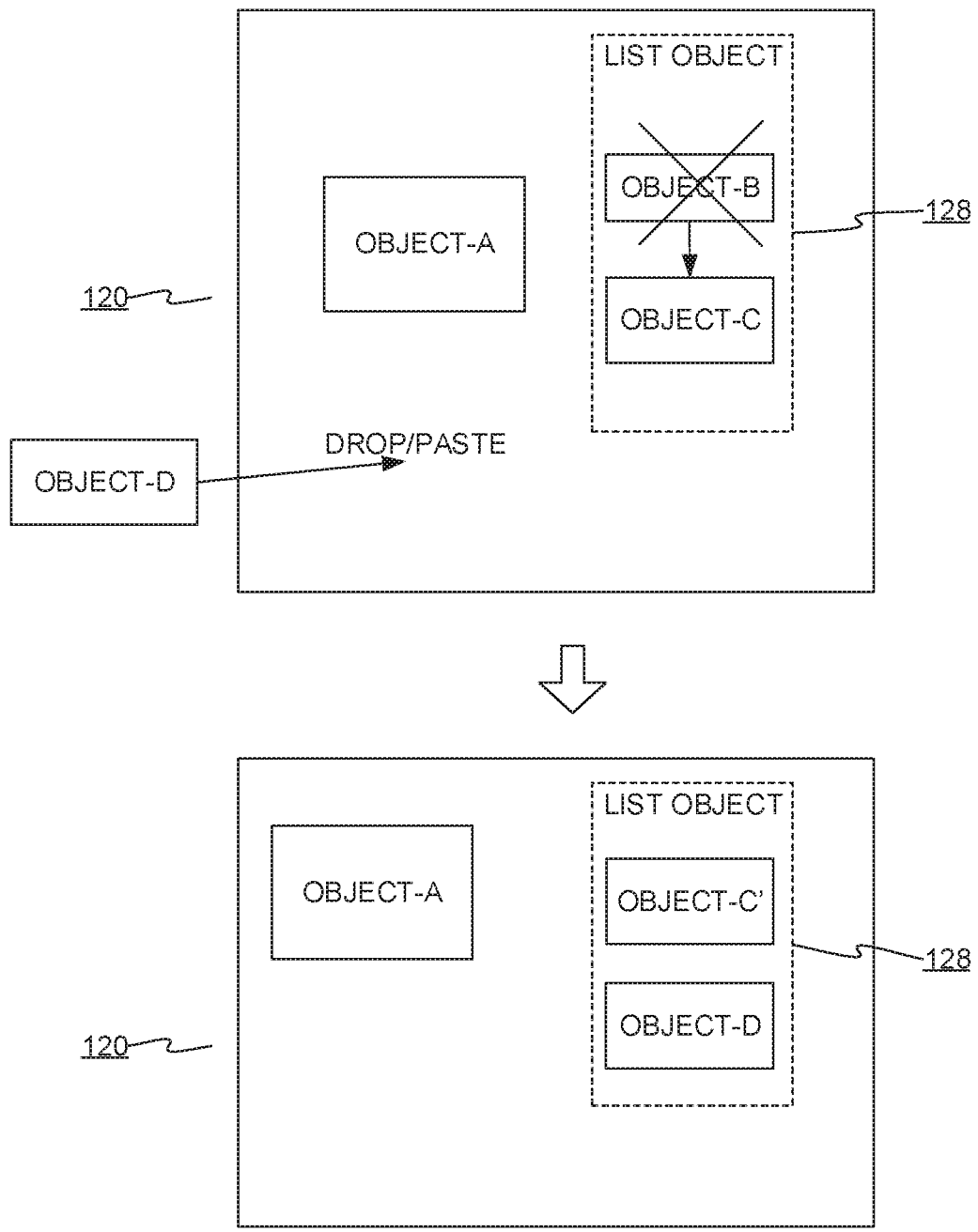
FIG. 6 shows other examples of curated journal transforms.

FIG. 6 shows other examples of curated journal transforms. In the upper half of FIG. 6, object-B has been determined to be subsumed or merged into object-C, forming object-C'. This operation may be triggered by a user command, a machine learning decision about the content of object-B vis-à-vis the list, object-C, and/or otherwise. This may or may not be accompanied by a curated transform or rearrangement of the graphic representation of object-C/C'. In addition, a drag of object-D onto the display area 120 may trigger an assessment of object-D's metadata and a resulting decision that object-D is associated with a particular list in the display area. In one embodiment, a drop/paste of an object into the display area may be associated with a specific list and the object is added to the list, perhaps in conjunction with a transform of the object and/or the list.

Although the journal application is described as an application, its logic can be implemented in any application, e.g. browser, a component of another application, etc.

Figure 7:
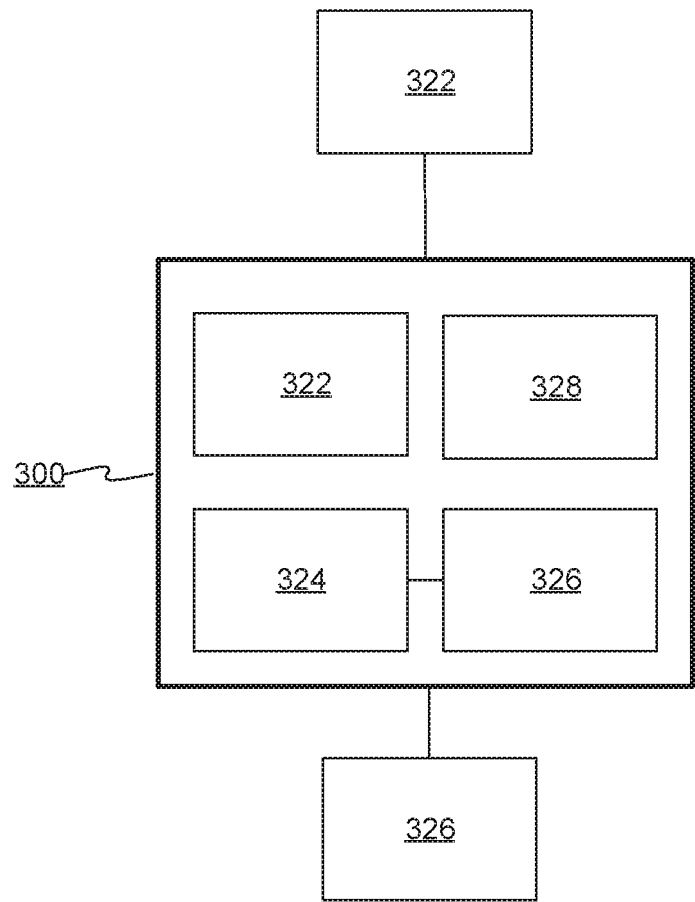
FIG. 7 shows details of a computing device on which embodiments described above may be implemented.

FIG. 7 shows details of a computing device 300 on which embodiments described above may be implemented. The computing device 300 is an example of a client/personal device or backend physical (or virtual) server devices that may perform various (or perhaps most) of the processes described herein. The technical disclosures herein will suffice for programmers to write software, and/or configure reconfigurable processing hardware (e.g., field-programmable gate arrays (FPGAs)), and/or design application-specific integrated circuits (ASICs), etc., to run on the computing device 300 (possibly via cloud APIs) to implement the embodiments described herein.

The computing device 300 may have one or more displays 322, a camera (not shown), a network interface 324 (or several), as well as storage hardware 326 and processing hardware 328, which may be a combination of any one or more: central processing units, graphics processing units, analog-to-digital converters, bus chips, FPGAs, ASICs, Application-specific Standard Products (ASSPs), or Complex Programmable Logic Devices (CPLDs), etc. The storage hardware 326 may be any combination of magnetic storage, static memory, volatile memory, non-volatile memory, optically or magnetically readable matter, etc. The meaning of the term "storage", as used herein does not refer to signals or energy per se, but rather refers to physical apparatuses and states of matter. The hardware elements of the computing device 300 may cooperate in ways well understood in the art of machine computing. In addition, input devices may be integrated with or in communication with the computing device 300. The computing device 300 may have any form-factor or may be used in any type of encompassing device. The computing device 300 may be in the form of a handheld device such as a smartphone, a tablet computer, a gaming device, a server, a rack-mounted or backplaned computer-on-a-board, a system-on-a-chip, or others.

Embodiments and features discussed above can be realized in the form of information stored in volatile or non-volatile computer or device readable storage hardware. This is deemed to include at least hardware such as optical storage (e.g., compact-disk read-only memory (CD-ROM)), magnetic media, flash read-only memory (ROM), or any means of storing digital information in to be readily available for the processing hardware 328. The stored information can be in the form of machine executable instructions (e.g., compiled executable binary code), source code, byte-code, or any other information that can be used to enable or configure computing devices to perform the various embodiments discussed above. This is also considered to include at least volatile memory such as random-access memory (RAM) and/or virtual memory storing information such as central processing unit (CPU) instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on.

The invention claimed is:

1. A method performed by a computing device comprising processing hardware and computing hardware, the method comprising:

executing an application comprising a displayable graphic view, the application receiving objects added to the graphic view, the application storing the received objects, the stored objects comprising respective content items of respective diverse content types, the graphic view concurrently displaying graphic object representations of the respective stored objects in the graphic view, wherein the objects are received by the application from other applications via a cut-and-paste or drag-and-drop service of an operating system of the computing device;

based on the objects being dropped into the graphic view, parsing, by the application, the content items of the respective objects to identify attributes of the objects, and based on the attributes of the objects, identifying a group feature of the objects having graphic object representations in the graphic view; and based on the identified group feature, automatically transforming, by the application, one or more of the stored objects, and correspondingly transforming the graphic object representations of the respective one or more stored objects.

2. A method according to claim 1, wherein the objects are added to the application according to user drag-and-drop inputs directed to the other applications from which the objects are dragged before being dropped into the graphic view.

3. A method according to claim 1, wherein the feature comprises a topic or subject derived from the content of the objects.

4. A method according to claim 1, wherein the application includes a list object managed by the application, wherein the list object is represented by a list graphic in the graphic view, is originated by the application and is not received via the cut-and-paste service, the method further comprising managing, by the application, the type, content, or graphic object representations of objects in the list object, wherein the list object is configured to enable manual addition of objects to the list object by dragging corresponding graphic object representations onto the list, and wherein dragging and dropping a graphic object representation onto the list triggers a curation operation.

5. A method according to claim 4, wherein the identifying the group feature is further based on context information managed by the application and associated with the objects.

6. A method according to claim 5, wherein the context information comprises one or more of: an indication of an application that has provided an object to the application, an indication of an application that has received an object from the application, user annotations inputted to the application without the cut and paste service, or GUI state of the application that is settable by user input.

7. A computing device comprising:
a display;
processing hardware;
storage hardware storing instructions configured to cause the processing hardware to perform a process comprising:
executing an application that stores and manages a collection of objects displayed on the display within a graphical user interface of the application, the objects comprising heterogenous content types obtained from other applications executing on the computing device through a copy-and-paste or drag-and-drop service executing on the computing device, wherein the application is configured to receive objects of arbitrary content types from the other applications through the copy-and-paste or drag-and-drop service;
managing, by the application, a list object automatically curated by the application based on the content of objects in the collection, the list object generated by the application and not received from another application, the list object having a corresponding list graphic displayed in the graphical user interface of the application; and
performing curation operations on the list object, the curation operations including automatically transforming a data type of an object in the list object, automatically moving an object to the list object and correspondingly displaying the object in the list object, and/or setting a property of the list object based on metadata about the objects in the graphical user interface.

8. A computing device according to claim 7, wherein the curating of the list is performed by a machine learning service that provides bases for curation operations to be performed on the list.

9. A computing device according to claim 8, wherein the machine learning service provides a basis for the curating according to contextual data associated with the list.

10. A computing device according to claim 9, wherein the basis comprises a commonality among the objects in the list that is determined by the machine learning service.

11. A computing device according to claim 7, wherein the curating comprises transforming an object or a graphic representation thereof in the list, the transforming based on the object being in the list.

12. A computing device according to claim 7, wherein the curating comprises transforming a feature of the list, the feature comprising a datatype, a topic, a keyword, and/or format.

13. A computing device according to claim 7, wherein the curating comprises adding an object to the list or removing an object from the list.

14. A computing device according to claim 13, wherein the adding an object comprises extracting content from an object in the list and using the extracted content to construct the added object, and removing the object comprises merging two objects in the list.

15. A storage device storing instructions configured to cause a computing device to perform a process comprising:
managing a display area by an application comprising the display area, the display area displaying, by a display of the computing device, graphic representations of respective heterogenous objects comprising heterogenous types of content, the heterogenous objects having been added to the display area by being interactively selected within, and imported via a cut-and-paste or drag-and-drop service, from other applications; and
providing, to a machine learning algorithm, indicia obtained from, or associated with, the objects, and obtaining from the machine learning algorithm a group feature identified by the machine learning algorithm from the indicia, the group feature corresponding to the objects in the aggregate;
automatically selecting and transforming, by the application, one or more of the objects according to the group feature, wherein the one or more objects are selected based on having a property determined to correspond to the group feature.

16. A storage device according to claim 15, the transforming comprising transforming the graphic representations respectively corresponding to the one or more of the objects according to the feature.

17. A storage device according to claim 15, wherein the feature comprises a topic, user-intent, or commonality among the objects, and wherein objects in a plurality of the objects are automatically organized in a list according to the feature, and wherein a graphic representation of the list is generated by the application and displayed in the display area, the graphic representation of the list comprising graphic representations of the respective objects in the plurality.

18. A storage device according to claim 15, wherein the transforming comprises extracting a piece of information from one of the objects according to the feature and changing the graphic representation of the one of the objects to represent the extracted piece of information.

19. A storage device according to claim 15, wherein the transforming comprises one or more of: automatically forming the objects into a list curated by the application, automatically changing a data type of an object, changing a graphic representation of an object, or changing a data type or application type of a list object containing one or more of the objects.

20. A storage device according to claim 15, the process further comprising collecting metadata from the objects and curating the list based on the collected metadata.

\* \* \* \* \*